United States Patent
Handlon et al.

(10) Patent No.: US 10,203,046 B2
(45) Date of Patent: Feb. 12, 2019

(54) DEGRESSIVE PNEUMATIC ACTUATOR SPRING RATE

(71) Applicant: BORGWARNER INC., Auburn Hills, MI (US)

(72) Inventors: Brian E. Handlon, Arden, NC (US); Ryan T. Howell, Hendersonville, NC (US)

(73) Assignee: BorgWarner Inc., Auburn Hills, MI (US)

(*) Notice: Subject to any disclaimer, the term of this patent is extended or adjusted under 35 U.S.C. 154(b) by 85 days.

(21) Appl. No.: 15/041,870

(22) Filed: Feb. 11, 2016

(65) Prior Publication Data

US 2017/0234452 A1    Aug. 17, 2017

(51) Int. Cl.
| | |
|---|---|
| *F16K 31/12* | (2006.01) |
| *F16K 31/122* | (2006.01) |
| *F16K 1/20* | (2006.01) |
| *F16K 31/163* | (2006.01) |

(52) U.S. Cl.
CPC ........ *F16K 31/1221* (2013.01); *F16K 1/2007* (2013.01); *F16K 31/1635* (2013.01)

(58) Field of Classification Search
CPC ............. F16K 31/1221; F16K 31/1635; F16K 1/2007; F16K 1/221; F16K 31/1262; F16K 31/1264; F01L 1/465; F01L 1/462
USPC .......................................... 251/62, 61, 61.2
See application file for complete search history.

(56) References Cited

U.S. PATENT DOCUMENTS

| | | | | |
|---|---|---|---|---|
| 2,209,844 | A | * | 7/1940 | Otto ......................... F24F 11/02 251/61 |
| 2,222,146 | A | * | 11/1940 | Jonsson ..................... B06B 3/00 209/365.3 |
| 2,765,141 | A | * | 10/1956 | Applegate ................. F16F 3/04 267/136 |
| 3,366,136 | A | | 1/1968 | Burton |
| 3,896,849 | A | | 7/1975 | Ervin et al. |
| 3,985,331 | A | | 10/1976 | Riley et al. |
| 4,198,028 | A | * | 4/1980 | Cook ...................... F02M 23/09 123/327 |
| 4,201,116 | A | | 5/1980 | Martin |
| 4,585,207 | A | * | 4/1986 | Shelton ................... F16K 3/186 251/196 |
| 5,533,873 | A | | 7/1996 | Kindl |

(Continued)

*Primary Examiner* — Craig J Price
*Assistant Examiner* — Andrew J Rost
(74) *Attorney, Agent, or Firm* — Miller, Matthias & Hull LLP (57) ABSTRACT

A valve actuator (100) and method for controlling such is disclosed. The valve actuator (100) may include a body (126), a piston (134), a first spring (136) displaceable between a primary position (154) and a secondary position (156), and a second spring (138) displaceable between a first position (158*a*) and a second position (160*a*). The first and second springs (136, 138) are configured to be simultaneously displaced during movement of the piston (134) from a first piston position (142) to a second piston position (144). The first spring (136) is configured to compress to a higher first spring force ($F_1$) during displacement from the primary position (154) to the secondary position (156), and the second spring (138) is configured to have a decreasing second spring force ($F_2$) during displacement from the first position (158*a*, 158*b*) to the second position (160*a*, 160*b*), the second spring force ($F_2$) decreasing non-linearly.

15 Claims, 7 Drawing Sheets

(56) References Cited

U.S. PATENT DOCUMENTS

| | | |
|---|---|---|
| 6,067,946 A | 5/2000 | Bunker et al. |
| 6,737,766 B1 | 5/2004 | Burrola et al. |
| 7,213,549 B2 | 5/2007 | Lou |
| 7,744,062 B2 | 6/2010 | Dalluge |
| 8,166,755 B2 | 5/2012 | Jeanson et al. |
| 2004/0051066 A1 | 3/2004 | Sturman |
| 2006/0027956 A1* | 2/2006 | Adoline ............... F16F 3/04 267/70 |
| 2008/0054214 A1* | 3/2008 | Olberding .......... F16K 31/1262 251/242 |
| 2013/0019955 A1* | 1/2013 | Bagagli ................ F04B 39/10 137/12 |
| 2015/0008627 A1* | 1/2015 | Leonard ................. F16F 7/09 267/64.24 |
| 2016/0025180 A1* | 1/2016 | Fukushima ........... F16F 9/5126 188/266.5 |

\* cited by examiner

DEGRESSIVE PNEUMATIC ACTUATOR SPRING RATE

TECHNICAL FIELD

The present disclosure generally relates to valve actuators, and more specifically to apparatus to control the rate of opening of a valve.

BACKGROUND

A swing valve may be used in a process control system to control a flowing fluid, for example exhaust gas. In one embodiment, such a swing valve may include a body having an outlet and a disc pivotally attached to the body. The disc may be moveable between a closed position and a fully open position. In the closed position, the disc covers the outlet. The flow of gas through the outlet is stopped when the disk is in the closed position. In the fully open position, the disc is pivoted away from the outlet and gas is free to flow through the outlet.

Typically, when the disc begins the transition between the closed position and the fully open position, gas begins to flow through the outlet. When the transition begins and the disc initially cracks open, the flow rate of the gas increases very quickly relative to the angle opening of the disc.

U.S. Pat. No. 7,744,062 discloses an apparatus to vary the effective spring rate of a diaphragm actuator for a control valve. The apparatus includes a first spring operatively coupled to a diaphragm plate and an actuator stem, and a second spring operatively coupled to the actuator stem and configured to be serially operative with the first spring. A movable spring seat is disposed between the first and second springs. While beneficial for controlling actuation, a better system is needed.

SUMMARY OF THE DISCLOSURE

In accordance with one aspect of the disclosure, a valve actuator is disclosed. The valve actuator may comprise a body having a cavity, a piston disposed inside the cavity, a first spring and a second spring. The piston moveable between a first piston position and a second piston position. The first spring having a spring constant $k_1$. The first spring disposed inside the cavity below the piston and displaceable between a primary position and a secondary position. The second spring (138) disposed inside the cavity and displaceable between a first position and a second position. The first and second springs are configured to be simultaneously displaced during movement of the piston from the first piston position to the second piston position. Further, the first spring is configured to compress to a higher first spring force during displacement of the first spring from the primary position to the secondary position, and the second spring is configured to have a decreasing second spring force during displacement from the first position to the second position, the second spring force decreasing non-linearly.

In accordance with another aspect of the disclosure, a method of controlling a valve actuator is disclosed. The valve actuator may include a body having a cavity, a piston disposed inside the cavity, a rod connected to the piston, a first spring and a second spring. The piston is moveable between a first piston position and a second piston position. The first spring has a spring constant $k_1$ and may be disposed below the piston inside the body. The first spring is displaceable between a primary position and a secondary position. The second spring may be displaceable between a first position and a second position inside the body. The method may comprise simultaneously displacing the first spring and the second spring during movement of the piston from the first piston position to the second piston position, compressing the first spring to a higher first spring force during the simultaneous displacement of the first spring from the primary position to the secondary position and the second spring from the first position to the second position, and decreasing a second spring force of the second spring 138 during displacement from the first position to the second position, the second spring force decreasing non-linearly.

In accordance with a further aspect of the disclosure a valve actuator is disclosed. The valve actuator may comprise a body having a cavity, a piston disposed inside the cavity, a rod connected to the piston and defining an axis, a first spring having a spring constant $k_1$, a second spring and a diaphragm. The piston moveable between a first piston position and a second piston position. The piston and the body defining a lower chamber. The rod movable between a retracted position and an extended position. The rod in the retracted position when the piston is in the first piston position. The rod in the extended position when the piston is in the second piston position. The first spring disposed inside the cavity below the piston and concentric with the rod. The first spring a compression spring displaceable between a primary position and a secondary position. The second spring disposed inside the cavity and displaceable between a first position and a second position. The diaphragm may be disposed inside the cavity above the piston and between the first and second springs. The diaphragm and the body may define an upper chamber. The first and second springs are configured to be simultaneously displaced during movement of the piston from the first piston position to the second piston position. Further, the first spring is configured to compress to a higher first spring force during displacement of the first spring from the primary position to the secondary position, and the second spring is configured to have a decreasing second spring force during displacement from the first position to an intermediate position, the second spring force decreasing non-linearly. The intermediate position may be an extended position of the second spring disposed between the first and second positions.

DETAILED DESCRIPTION

Referring now to FIGS. 1-2 and 5-7, this disclosure describes exemplary embodiments of a valve actuator 100. While the exemplary embodiments of the valve actuator 100 are described relative to an exemplary system 102 for opening and closing a swing valve 104 (see FIGS. 3-4), the teachings of this disclosure may be employed to actuate other types of valves. In the exemplary embodiment, the exemplary system 102 includes the swing valve 104, the actuator 100 and a pressurized gas supply 106.

The swing valve 104 may include a housing 108 having an inlet (not shown), an outlet 110 (FIG. 4), a seat 112 around the outlet 110 and a disc 114 pivotally attached to the housing 108. The disc 114 may be moveable between a closed position 116 (see FIG. 3) and a fully open position 118 (see FIG. 4). In the closed position 116 (FIG. 3), the disc 114 is disposed against the seat 112 and covers and seals the outlet 110. The flow of fluid (for example, exhaust gas) out of the swing valve 104 through the outlet 110 is stopped when the disc 114 is in the closed position 116. When the disc 114 is pivoted away from the outlet 110, the fluid is free to flow out of the swing valve 104 through the outlet 110. The fluid may be gas or liquid. The disc 114 may be operatively connected (for example, via linkage 120 or the like) to a rod 122 of the valve actuator 100. Movement of the rod 122 may result in the disc 114 pivoting to the fully open position 118 or to the closed position 116. The pressurized gas supply 106 may be connected to the valve actuator 100 by a port 124, or the like. The pressurized gas supply 106 may be configured to selectively supply pressurized gas 166 (for example, air) to the valve actuator 100.

Figure 1:
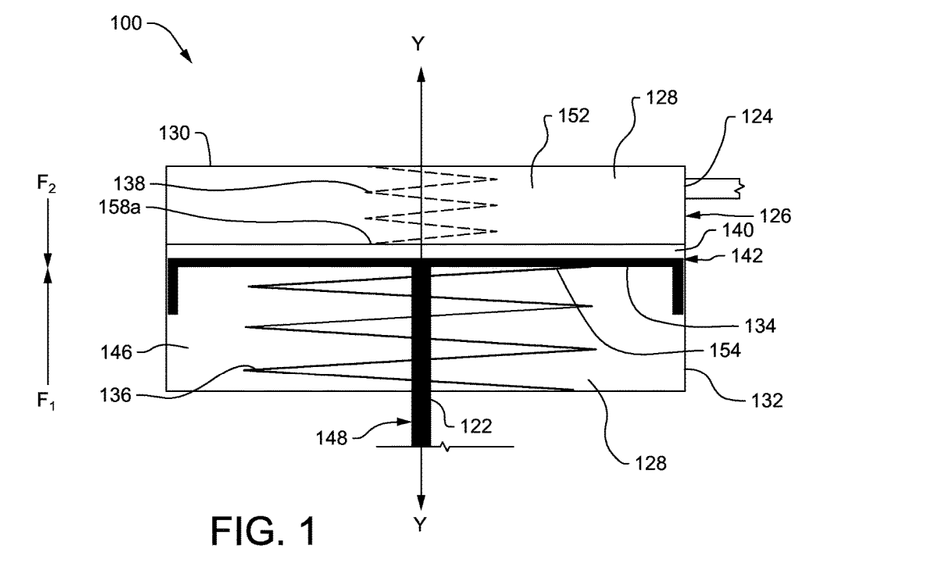
FIG. 1 is a schematic view of one exemplary embodiment of a valve actuator including a piston and a rod, the piston in an exemplary first piston position.
Figure 2:
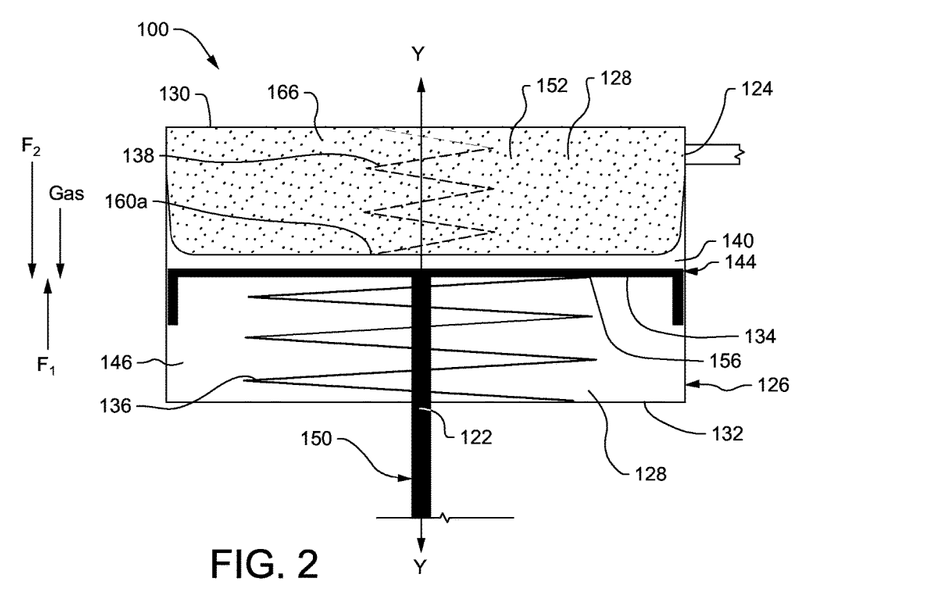
FIG. 2 is a schematic view of the valve actuator of FIG. 1 with the piston in an exemplary second piston position.

FIGS. 1-2 illustrate one exemplary embodiment of the valve actuator 100. The valve actuator 100 may include a body 126 having a cavity 128, a piston 134, a rod 122, a first spring 136 and a second spring 138. The valve actuator 100 may also include a diaphragm 140. In some embodiments, the body 126 may include an upper casing 130 and a lower casing 132.

The piston 134 is disposed inside the cavity 128 and is moveable between a first piston position 142 and a second piston position 144. The piston 134 and the body 126 define a lower chamber 146. More specifically, in the embodiment illustrated in FIGS. 1-2, the piston 134 and the lower casing 132 define the lower chamber 146.

The rod 122 has an elongated profile. One end of the rod 122 is connected to the piston 134 and the opposite end protrudes from the body 126 and is operatively coupled to the linkage 120. The rod 122 defines an axis Y. The rod 122 is moveable along the axis Y between a retracted position 148 and an extended position 150. The rod 122 may be in the retracted position 148 when the piston 134 is in the first piston position 142. Movement toward the retracted position 148 is movement in a direction toward the upper casing 130 and results in a shorter length of the rod 122 protruding from the body 126. The rod 122 may be in the extended position 150 when the piston 134 is in the second piston position 144. Movement of the rod 122 toward the extended position 150 is movement in a direction away from the upper casing 130 and results in a longer length of the rod 122 protruding from the body 126.

The diaphragm 140 may be disposed inside the cavity 128 of the body 126 above the piston 134. The diaphragm 140 and the body 126 may define an upper chamber 152. More specifically, the diaphragm 140 and the upper casing 130 define the upper chamber 152. In embodiments that do not include a diaphragm 140, the piston 134 and the body 126 (or upper casing 130 of the body 126) may define the upper chamber 152. The diaphragm 140 extends across the width of the body 126 sealing the upper chamber 152 from the lower chamber 146.

The first spring 136 has a spring constant $k_1$. The first spring 136 is disposed inside the cavity 128 below the piston 134. In an embodiment, the first spring 136 may be disposed inside the lower chamber 146 of the cavity 128 below the piston 134. The first spring 136 may be concentric with the rod 122 (concentric with the axis Y defined by the rod 122). The first spring 136 may be a compression spring that is displaceable between a primary position 154 and a secondary position 156 in a direction along the axis Y. More specifically, the first spring 136 may be compressible between the primary position 154 and the secondary position 156.

The second spring 138 is a non-linear spring (meaning, the second spring force $F_2$ provided by the second spring 138 in relation to the displacement of the second spring 138 is non-linear). The second spring 138 is disposed inside the cavity 128 and is displaceable between a first position 158a and a second position 160a.

In the embodiment illustrated in FIGS. 1-2, the second spring 138 is a (non-linear) compression spring that is disposed above the piston 134 (and the diaphragm 140). In the embodiment, illustrated in FIGS. 1-2, the second spring 138 may be disposed in the upper chamber 152 so that it is concentric with axis Y defined by the rod 122 and is displaceable in a direction along the axis Y.

Figure 5:
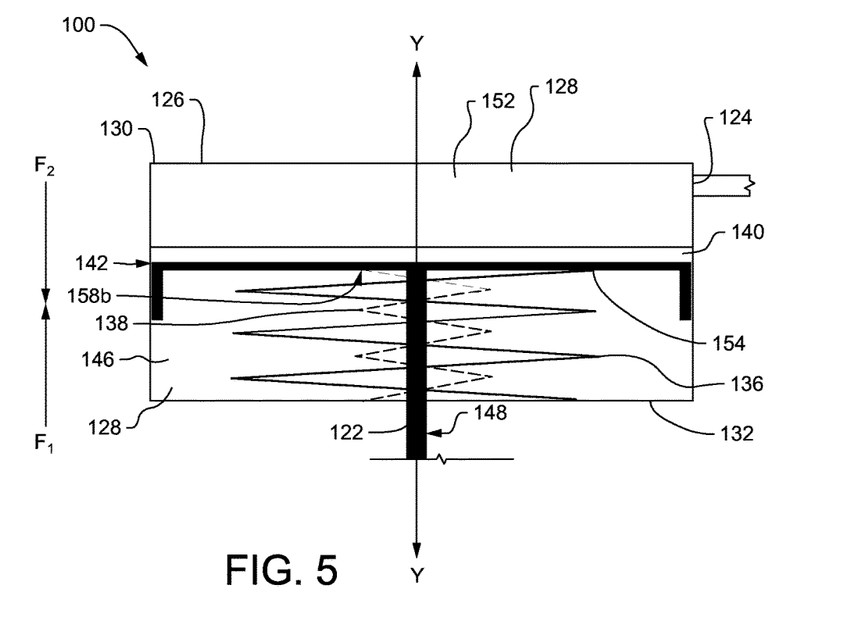
FIG. 5 is a schematic view of another exemplary embodiment of the valve actuator, the piston in the first piston position.
Figure 6:
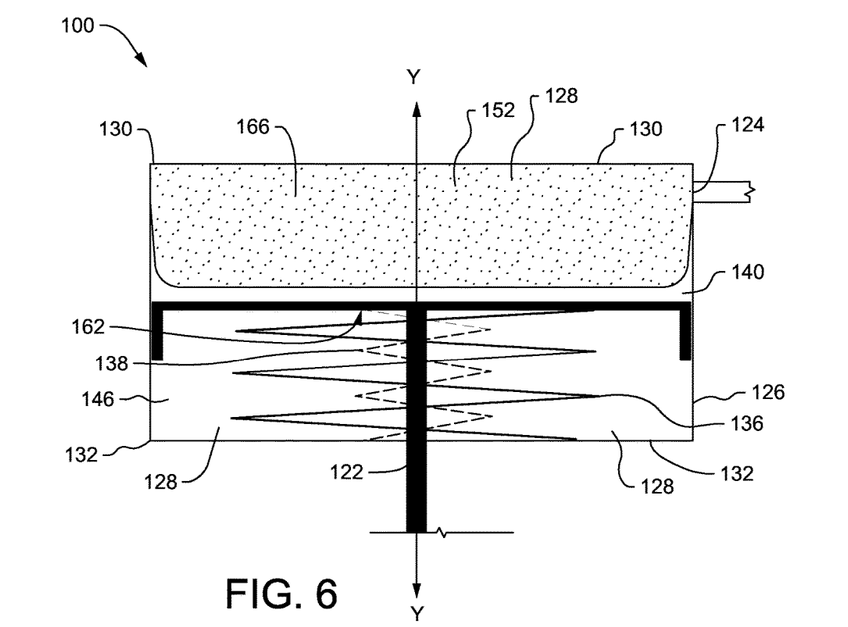
FIG. 6 is a schematic view of the valve actuator of FIG. 5, the piston disposed between the first piston position and the second piston position.
Figure 7:
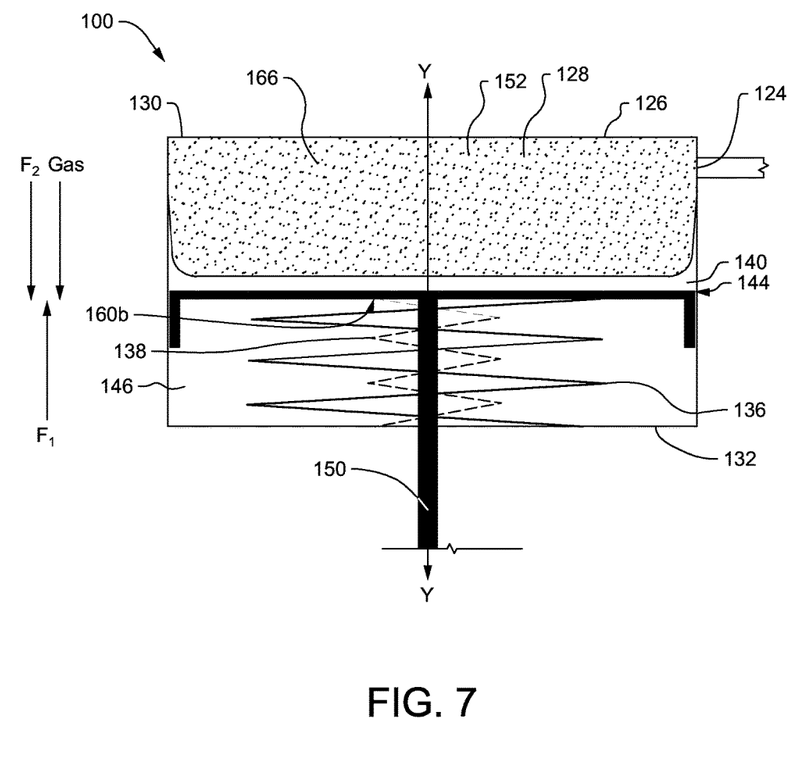
FIG. 7 is a schematic view of the valve actuator of FIG. 5, the piston in the second piston position.

An alternative embodiment of the valve actuator 100 is illustrated in FIGS. 5-7. The alternative embodiment of the valve actuator 100 in FIGS. 5-7 is similar to the embodiment of FIGS. 1-2 except that the second spring 138 is an (non-linear) extension spring instead of a compression spring and is disposed in the cavity 128 below the piston 134 instead of above the piston 134. More specifically, the second spring 138 in FIGS. 5-7 is connected to the bottom of the piston 134 and is disposed in the lower chamber 146 of the cavity 128. In the embodiment shown in FIGS. 5-7, the second spring 138 is concentric with the rod 122 (concentric with the axis Y defined by the rod 122). In one embodiment, the second spring 138 may be concentrically nested inside the first spring 136. In other embodiments, the first spring 136 may be concentrically nested inside the second spring 138.

The second spring 138 of FIGS. 5-7 is displaceable between a first position 158b and a second position 160b. In FIG. 5, the second spring 138 is shown in the first position 158b. In FIG. 7, the second spring 138 is shown in the second position 160b. In FIG. 6, the second spring 138 is shown in an intermediate position 162 disposed between the first position 158b and the second position 160b.

The port 124 is disposed in the body 126 and is a passage into the upper chamber 152 for pressurized gas 166 (for example, pressurized air) supplied by the pressurized gas supply 106. The port 124 is disposed in the body 126 above the piston 134.

INDUSTRIAL APPLICABILITY

When the disc 114 of the swing valve 104 is in the closed position 116 (FIG. 3), the piston 134 of the valve actuator 100 may, in one scenario, be in the first piston position 142

(FIG. 1 or 5) and the rod 122 may be in the retracted position 148 as shown in FIGS. 1 and 5.

Figure 3:
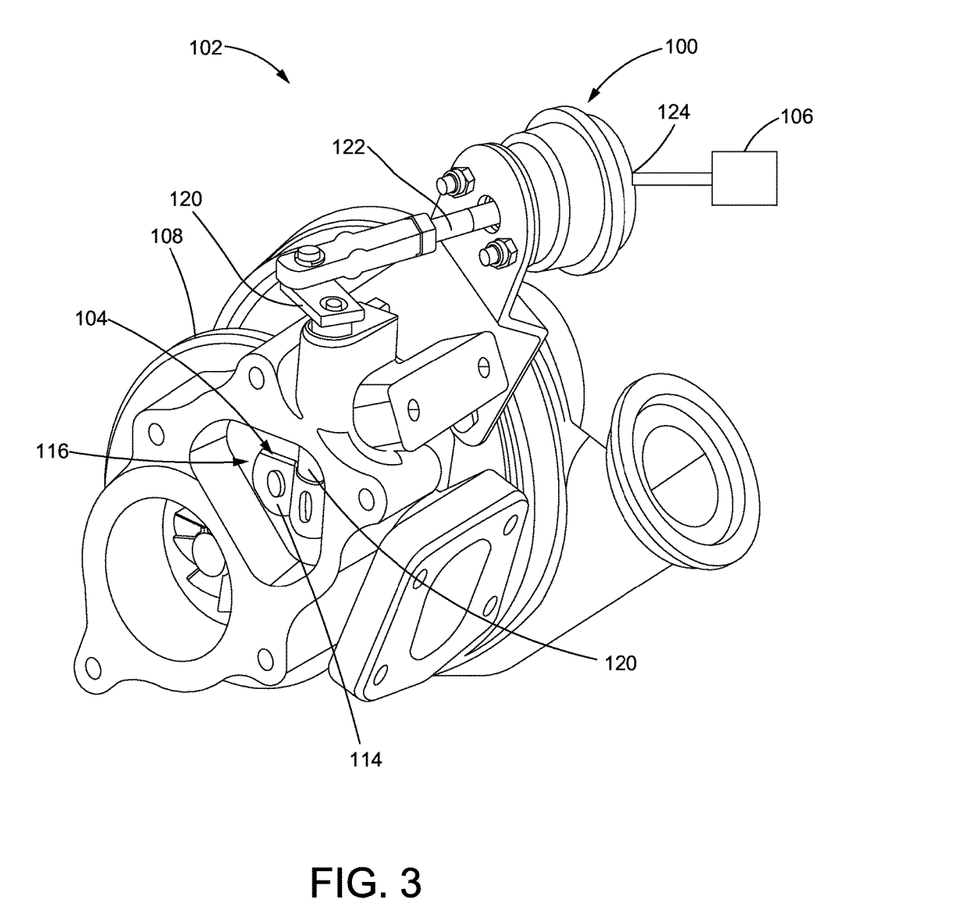
FIG. 3 is view of an embodiment of an exemplary system that includes a swing valve having a disc adjacent to an outlet, the disc in a closed position covering the outlet.
Figure 4:
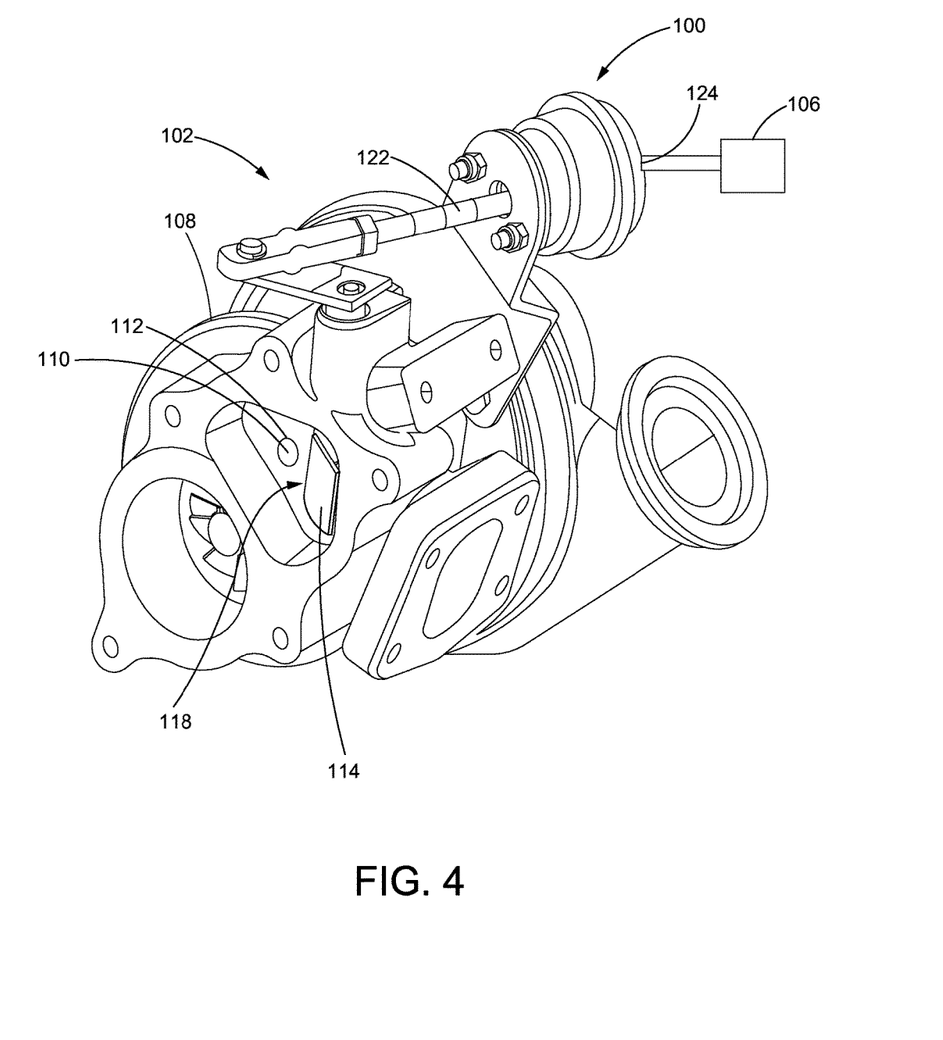
FIG. 4 is view of the system of FIG. 3 with the disc in a fully open position exposing the outlet.

In the embodiment illustrated in FIG. 1, the second spring 138 is in a compressed state and (the end of the second spring 138 adjacent to the piston 134) is displaced to the first position 158a when the disc 114 of the swing valve 104 is in the closed position 116 (FIG. 3). When the second spring 138 is displaced to the first position 158a, as shown in FIG. 1, a spring force F (restoring force) is exerted against the piston 134 by the second spring 138.

For the purposes of the discussion herein, the spring force F exerted by the second spring 138 will be referred to as the second spring force $F_2$. In the exemplary embodiment of FIGS. 1-2, the second spring force $F_2$ may be thought of as a downward force pushing the piston 134 (and the diaphragm 140) toward the lower chamber 146 and toward the bottom of the cavity 128.

In the embodiment of FIG. 1, the first spring 136 is in its primary position 154 when the disc 114 is in the closed position 116 (FIG. 3). In this primary position 154, the first spring 136 provides an opposing (in this example, upward) first spring force $F_1$ on the piston 134 that is large enough to compress the second spring 138 (overcome the second spring force $F_2$ exerted by the second spring 138, and any additional downward force from any gas 166 that may be present in the upper chamber 152) and to hold the piston 134 in the piston first position 142.

To actuate the valve actuator 100, pressurized gas 166 from the pressurized gas supply 106 is allowed to flow into the upper chamber 152 (via the port 124). As more pressurized gas 166 enters the upper chamber 152, pressure from the gas 166 confined in the upper chamber 152 increases. The pressure of the gas 166 in the upper chamber 152 and the second spring force $F_2$ of second spring 138 exert a combined downward force on the piston 134 (and diaphragm 140) that overcomes the opposing first spring force $F_1$ of the first spring 136 (and any force on the piston 134 from the rod 122). This results in the piston 134 moving from the first piston position 142 (FIG. 1) to the second piston position 144 (FIG. 2). The force on the piston 134 from the rod 122 may be those resistive forces that must be overcome before the disc 114 (FIG. 4) can be moved off of the seat 112 (for example, inertia, etc.). Such resistive forces may be transferred to the rod 122 via the linkage 120.

In the exemplary embodiment of FIGS. 1-2, as the first spring 136 compresses to a higher (or increasing) first spring force $F_1$, the second spring 138 extends to a lower (or decreasing) second spring force $F_2$. In an embodiment, the first spring force $F_1$ may increase linearly with displacement according to Hooke's law $F_1 = -k(x)$ where $F_1$ is the restoring force exerted by the first spring 136, k is the spring constant of the first spring 136, and x is a change in the length (of the first spring 136) relative to its free length when at rest. Herein, the change in length x of a spring (either the first spring 136 or the second spring 138) may be referred to as the "displacement" or being "displaced" or the like.

The second spring force $F_2$ of the second spring 138 changes as a function of displacement too but, unlike the first spring force $F_1$, it changes non-linearly with displacement. For example, in the scenario above, when the second spring 138 extends, the second spring force $F_2$ decreases at a non-linear rate. (Similarly, when the second spring 138 compresses, the second spring force $F_2$ increases at a non-linear rate.)

When the piston 134 moves to the second piston position 144, the rod 122 moves from the retracted position 148 to the extended position 150. In the exemplary embodiment of FIGS. 1-2, movement of the rod 122 from the retracted position 148 to the extended position 150 causes (via the linkage 120) the disc 114 to pivot open.

When the pressurized gas supply 106 no longer supplies pressurized gas 166 (to the upper chamber 152), the aggregate downward force on the piston 134 will decrease until such time that the first spring force $F_1$ provided by the first spring 136 overcomes the second spring force $F_2$ of the second spring 138 and the piston 134 returns to the first piston position 142. When the piston 134 moves from the second piston position 144 (FIG. 2) to the first piston position 142 (FIG. 1), the rod 122 moves from the extended position 150 (FIG. 2) to the retracted position 148 (FIG. 1). In the exemplary embodiment, movement of the rod 122 from the extended position 150 to the retracted position 148 causes the disc 114 (FIG. 1) to pivot to the closed position 116.

In an alternative embodiment, the valve actuator 100 of FIGS. 5-7, may be utilized. When the disc 114 (FIG. 3) of the swing valve 104 is in the closed position 116, the piston 134 (FIG. 5) of the valve actuator 100 may be in the first piston position 142 and the rod 122 may be in the retracted position 148 as shown in FIG. 5.

In this initial position, the second spring 138 is in an extended state and (the end of the second spring 138 adjacent to the piston 134) is at the first position 158b. In this first position 158b a downward (pulling) second spring force F2 is being exerted on the piston 134 by the second spring 138. This second spring force F2 has the effect of pulling the piston 134 away from the upper chamber 152.

The first spring 136 is shown in its primary position 154. In this position, the first spring 136 provides an opposing (in this example, upward) first spring force $F_1$ that is large enough to balance the second spring force $F_2$ exerted by the second spring 138 (and any additional downward force on the piston 134 from any gas 166 that may be present in the upper chamber 152) and to hold the second spring 138 in an extended state and to hold the piston 134 in the first piston position 142.

To actuate the valve actuator 100, pressurized gas 166 from the pressure gas supply 106 is allowed to flow into the upper chamber 152 via the port 124. As more pressurized gas 166 enters the upper chamber 152, the pressure from the gas 166 contained in the upper chamber 152 increases as does the downward force it exerts on the diaphragm 140 and the piston 134. The combined forces of the gas 166 pressure (in the upper chamber 152) and the second spring force $F_2$ of the second spring 138 exert a downward force on the piston 134 that in aggregate overcomes the opposing first spring force $F_1$ of the first spring 136 (and any force on the piston 134 from the rod 122). This results in the piston 134 moving from the first piston position 142 (FIG. 5) to the second piston position 144 (FIG. 7).

As the first spring 136 compresses to a higher (or increasing) first spring force $F_1$, the second spring 138 extends (is extended) to a lower (or decreasing) second spring force $F_2$. More specifically, the second spring 138 is displaced from the first position 158b (FIG. 5) in which the second spring 138 is in an extended state and is displaced a first length $x_1$, to a second position 160b (FIG. 7) in which the second spring 138 is displaced a second length $x_2$, wherein the second (displacement) length $x_2$ is less than the first (displacement) length $x_1$. In some embodiments, when the second spring 138 is in the second position 160b, the second (displacement) length $x_2$ may be zero or about zero. In other embodiments, when the second spring 138 is in the second position 160b, the second (displacement) length $x_2$ may be greater than zero (for example, when the second spring 138 is still in an extended state). During displacement from the first position 158b (FIG. 5) to the second position 160b (FIG. 7), the second spring 138 passes through intermediate positions 162 (for example, see FIG. 6) disposed between the first position 158b and the second position 160b. When in an intermediate position 162, the second spring 138 is in an extended state and is displaced an intermediate length $x_3$. The intermediate length $x_3$ is less than the first (displacement) length $x_1$ and is greater than the second (displacement) length $x_2$. Similar to the embodiment illustrated in FIGS. 1-2, second spring force $F_2$ of the embodiment illustrated in FIGS. 5-7, increases or decreases non-linearly as a function of the displacement of the second spring 138.

When the piston 134 moves from the first piston position 142 (FIG. 5) to the second piston position 144 (FIG. 7), the rod 122 moves from the retracted position 148 (FIG. 5) to the extended position 150 (FIG. 7). In the exemplary embodiment, movement of the rod 122 from the retracted position 150 (FIG. 5) to the extended position 150 (FIG. 7) causes the disc 114 (FIG. 4) (via the linkage 120) to pivot to the fully open position 118.

When the pressurized gas supply 106 no longer supplies pressurized gas 166 to the upper chamber 152, the downward force on the piston 134 begins to decrease. At some point, the upward first spring force $F_1$ provided by the compressed first spring 136 balances the downward second spring force $F_2$ of the second spring 138 and the piston 134 returns to the first piston position 142 (FIG. 5). When the piston 134 moves from the second piston position 144 (FIG. 7) to the first piston position 142 (FIG. 5), the rod 122 moves from the extended position 150 (FIG. 7) to the retracted position 148 (FIG. 5). In the exemplary embodiment, movement of the rod 122 from the extended position 150 (FIG. 7) to the retracted position 148 (FIG. 5) causes the disc 114 (FIG. 3) (via the linkage 120) to pivot to the closed position 116.

In both of the exemplary embodiments (FIGS. 1-2, and 5-7) described above, the first and second springs 136, 138 are configured to be simultaneously displaced during movement of the piston 134 from the first piston position 142 to the second piston position 144. Further, the first spring 136 is configured to compress linearly to a higher spring force $F_1$ during displacement of the first spring 136 from the primary position 154 to the secondary position 156, and the second spring 138 is configured to have a (non-linearly) decreasing second spring force $F_2$ during displacement from the first position 158a, 158b to the intermediate position 162 (the intermediate position 162 an extended position of the second spring 138 disposed between the first position 158a, 158b and the second position 160a, 160b). In some embodiments, the second spring 138 is configured to have a (non-linearly) decreasing second spring force $F_2$ during displacement from the first position 158a, 158b to the second position 160a, 160b.

In both of the embodiments (FIGS. 1-2, and 5-7) described above the combined first spring force $F_1$ and the second spring force $F_2$ increases in a non-linear fashion as the piston 134 moves from the first piston position 142 to the second piston position 144 and the rod 122 (end) travels from the retracted position 148 to the extended position 150.

Figure 8:
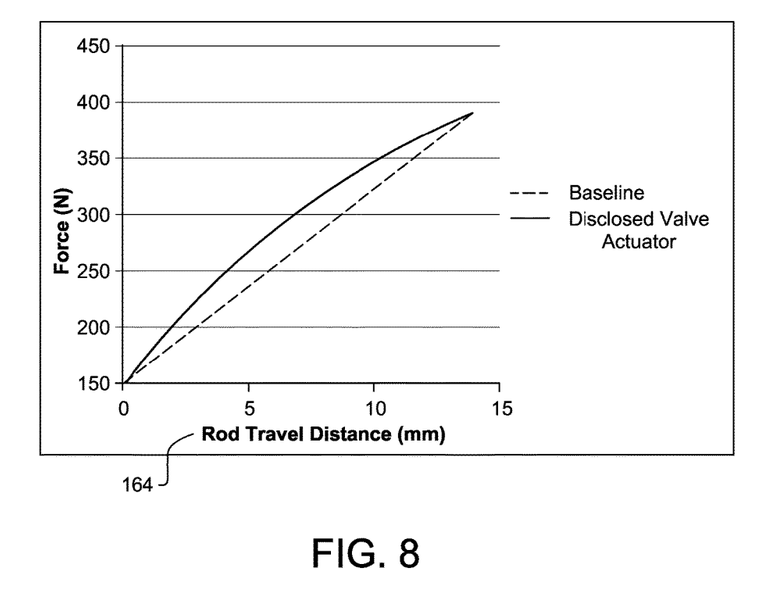
FIG. 8 is an exemplary graph of the net spring force relative to the rod travel distance.

In FIG. 8, the net spring force acting on the piston 134 is plotted versus the travel distance of the rod 122 (the end of the rod 122 that is distal to the piston 134). The baseline on FIG. 8 represents the net spring force of a valve actuator with a single compression spring disposed below a piston. The line labeled "Disclosed Valve Actuator" represents the net spring force (of the first spring force $F_1$ and the second spring force $F_2$) plotted relative to the travel distance 164 of the rod 122. As can be seen in FIG. 8, the baseline relationship between the net spring force provided by the single compression spring to the distance traveled by the rod increases linearly. Whereas, the net spring force of the first spring 136 and the second spring 138 (of the embodiments described herein) increases in a non-linear fashion relative to the distance 164 traveled by the rod 122. As the first spring 136 compresses, it provides a higher spring force $F_1$ because of the increasing displacement length of the first spring 136; as the second spring 138 extends, it provides a decreasing spring force $F_2$ as the second spring's 138 displacement length is reduced.

Figure 9:
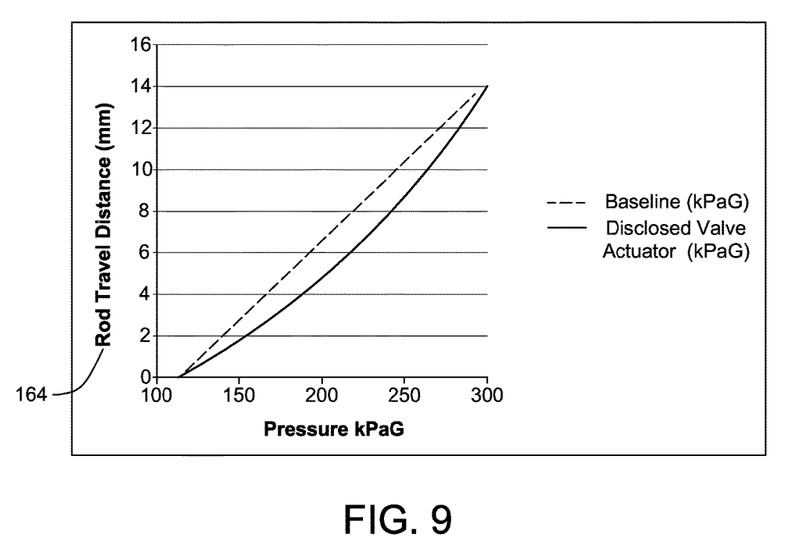
FIG. 9 is an exemplary graph of the rod travel distance relative to the gas pressure in the valve actuator.

FIG. 9 illustrates the force of the pressurized gas 166 against the diaphragm 140 relative to the rod 122 travel distance 164. The baseline illustrates the force of the pressurized gas in a valve actuator with a single compressed spring disposed below a piston. The line labeled "Disclosed Valve Actuator" represents the force of the pressurized gas 166 against the diaphragm 140 with the use of either of the novel embodiments disclosed herein. As can be seen in FIG. 9, during most of the actuation process for the swing valve 104, a lower gas 166 pressure may be utilized with the novel embodiments illustrated above.

Figure 10:
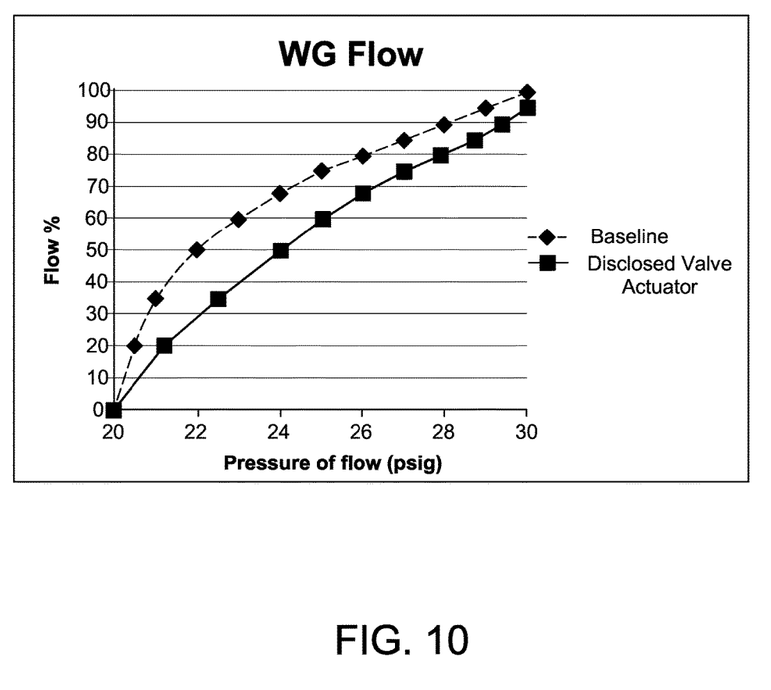
FIG. 10 is an exemplary graph of the percentage of fluid flow through the outlet relative to the pressure of the fluid flowing through the outlet.

FIG. 10 illustrates the percentage of flow of the fluid (for example, exhaust gas) through the outlet 110 of the swing valve 104 relative to the pressure of such fluid flowing through the outlet 110. The baseline illustrates that in a valve actuator with a single compressed spring disposed below a piston the pressure of the fluid initially increases rapidly when the disc 114 begins to open and to move away from the outlet 110. Whereas with the novel embodiments herein, the rate of speed of the opening of the disc 114 is slower initially and then faster proximal to the full open position 118 of the disc 114; this results in the pressure of the fluid escaping from the outlet 110 increasing in a generally linear fashion instead of incurring a flow rate spike when the disc 114 initially begins to pivot to the open position 118 and the angle opening (of the disc 114) is relatively narrow.

Also disclosed is a method for controlling the valve actuator 100, the method comprising: introducing pressurized gas 166 into the upper chamber 152, simultaneously displacing the first spring 136 and the second spring 138 during movement of the piston 134 from the first piston position 142 to the second piston position 144; compressing the first spring 136 to a higher first spring force $F_1$ during the simultaneous displacement of the first spring 136 from the primary position 154 to the secondary position 156 and the second spring 138 from the first position 158a, 158b to the second position 160a, 160b; and decreasing the second spring force $F_2$ of the second spring 138 during the displacement from the first position 158a, 158b to the second position 160a, 160b, wherein the second spring force $F_2$ decreases non-linearly The features disclosed herein may be particularly beneficial for use with valve actuators 100 used to control the rate of flow of a fluid, for example exhaust gas. The novel embodiments disclosed herein improve the controllability of fluid flow through a swing valve 104 and provide a lower initial rate of opening of the swing valve 104 which results in a more controlled rate of gas (for example, exhaust gas) flow out of the swing valve 104. Such an improvement is beneficial and an advancement in this area.

What is claimed is:
1. A method of controlling a valve actuator, the valve actuator including a body having a cavity, the cavity includ- ing an upper chamber and a lower chamber, the upper chamber configured to receive pressurized gas through a port that extends from the exterior of the body into the upper chamber, a piston disposed inside the cavity, the piston disposed between and adjacent to the upper chamber and the lower chamber, the piston moveable between a first piston position and a second piston position, a rod connected to the piston, a first spring having a spring constant and disposed below the piston inside the body, the first spring displaceable between a primary position and a secondary position, a second spring displaceable between a first position and a second position inside the body, the method comprising:

receiving pressurized gas into the upper chamber through the port;
  simultaneously displacing the first spring and the second spring during movement of the piston from the first piston position to the second piston position;
  compressing the first spring to a higher first spring force during the simultaneous displacement of the first spring from the primary position to the secondary position and the second spring from the first position to the second position; and
  decreasing a second spring force of the second spring 138 during displacement from the first position to the second position, the second spring force decreasing non-linearly.

2. The method of claim 1, wherein the second spring is a compression spring.

3. The method of claim 2, wherein the second spring is disposed above the piston.

4. The method of claim 1, wherein the second spring is an extension spring.

5. The method of claim 4, wherein the second spring is disposed below the piston.

6. A valve actuator comprising:
  a body having a cavity, the cavity including an upper chamber and a lower chamber, the upper chamber configured to receive pressurized gas through a port that extends from the exterior of the body into the upper chamber;
  a piston disposed inside the cavity, the piston disposed between and adjacent to the upper chamber and the lower chamber, the piston moveable between a first piston position and a second piston position;
  a first spring having a spring constant, the first spring disposed inside the cavity below the piston and displaceable between a primary position and a secondary position;
  a second spring disposed inside the cavity and displaceable between a first position and a second position; and
  wherein the first and second springs are configured to be simultaneously displaced during movement of the piston from the first piston position to the second piston position,
  wherein further the first spring is configured to compress to a higher first spring force during displacement of the first spring from the primary position to the secondary position, and the second spring is configured to have a decreasing second spring force during displacement from the first position to the second position, the second spring force decreasing non-linearly.

7. The valve actuator of claim 6, wherein the second spring is a compression spring.

8. The valve actuator of claim 7, wherein the second spring is disposed above the piston.

9. The valve actuator of claim 6, wherein the second spring is an extension spring.

10. The valve actuator of claim 9, wherein the second spring is disposed below the piston.

11. A valve actuator comprising:
  a body having a cavity, the cavity including an upper chamber and a lower chamber, the upper chamber configured to receive pressurized gas through a port that extends from the exterior of the body into the upper chamber;
  a piston disposed inside the cavity, the piston disposed between and adjacent to the upper chamber and the lower chamber, the piston moveable between a first piston position and a second piston position, the piston and the body defining the lower chamber;
  a rod connected to the piston and defining an axis, the rod movable between a retracted position and an extended position, the rod in the retracted position when the piston is in the first piston position, the rod in the extended position when the piston is in the second piston position;
  a first spring having a spring constant, the first spring disposed inside the cavity below the piston and concentric with the rod, the first spring a compression spring displaceable between a primary position and a secondary position;
  a second spring disposed inside the cavity and displaceable between a first position and a second position; and
  a diaphragm disposed inside the cavity above the piston, the diaphragm and the body defining an upper chamber;
  wherein the first and second springs are configured to be simultaneously displaced during movement of the piston from the first piston position to the second piston position,
  wherein further the first spring is configured to compress to a higher first spring force during displacement of the first spring from the primary position to the secondary position, and the second spring is configured to have a decreasing second spring force during displacement from the first position to an intermediate position, the second spring force decreasing non-linearly, the intermediate position an extended position of the second spring disposed between the first and second positions.

12. The valve actuator of claim 11, wherein the second spring is a compression spring disposed above the piston and the diaphragm is disposed between the first and second springs.

13. The valve actuator of claim 11, wherein the second spring is an extension spring disposed below the piston and concentric with the rod and the first spring.

14. The valve actuator of claim 13, wherein the second spring is nested inside the first spring and is attached to the piston.

15. The valve actuator of claim 11, wherein the net spring force of the first spring force and the second spring force is non-linear relative to a travel distance of the rod.

* * * * *